(12) United States Patent
Fujiwara et al.

(10) Patent No.: US 11,982,355 B2
(45) Date of Patent: May 14, 2024

(54) YARN AND GLAND PACKING

(71) Applicant: NIPPON PILLAR PACKING CO., LTD., Osaka (JP)

(72) Inventors: Masaru Fujiwara, Osaka (JP); Misato Izuka, Osaka (JP); Ryoji Hamaguchi, Osaka (JP); Naoyuki Sawamoto, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 929 days.

(21) Appl. No.: 16/963,328

(22) PCT Filed: Jan. 15, 2019

(86) PCT No.: PCT/JP2019/000890
§ 371 (c)(1),
(2) Date: Jul. 20, 2020

(87) PCT Pub. No.: WO2019/187503
PCT Pub. Date: Oct. 3, 2019

(65) Prior Publication Data
US 2020/0347936 A1 Nov. 5, 2020

(30) Foreign Application Priority Data

Mar. 30, 2018 (JP) ................................. 2018-067566

(51) Int. Cl.
*F16J 15/22* (2006.01)
*D02G 3/04* (2006.01)
(Continued)

(52) U.S. Cl.
CPC ................ *F16J 15/22* (2013.01); *D02G 3/04* (2013.01); *D02G 3/06* (2013.01); *D02G 3/36* (2013.01);
(Continued)

(58) Field of Classification Search
CPC .. F16J 15/20; F16J 15/22; D02G 3/04; D02G 3/06; D02G 3/36; D04B 1/225;
(Continued)

(56) References Cited

U.S. PATENT DOCUMENTS 6,270,083 B1 * 8/2001 Hirschvogel ............ F16J 15/22
277/540
6,385,956 B1 * 5/2002 Ottinger ................... F16J 15/22
428/362
(Continued)

FOREIGN PATENT DOCUMENTS

JP 63-6272 U 1/1988
JP 63-85643 U 6/1988
(Continued)

OTHER PUBLICATIONS

International Search Report dated Apr. 23, 2019 in PCT/JP2019/000890 filed on Jan. 15, 2019, 2 pages.
Extended European Search Report dated Oct. 5, 2021 in corresponding European Patent Application NO. 19775912.9, 8 pages.

*Primary Examiner* — Gilbert Y Lee
(74) *Attorney, Agent, or Firm* — Oblon, McClelland, Maier & Neustadt, L.L.P.

(57) ABSTRACT

A yarn includes elongated pieces of expanded graphite sheet and a tubular member made of knitted or braided fibers. In the tubular member, the pieces of expanded graphite sheet are twisted and packed. The yarns are knitted, or bundles of the yarns are twisted to form a gland packing.

6 Claims, 8 Drawing Sheets

(51) Int. Cl.
 *D02G 3/06* (2006.01)
 *D02G 3/36* (2006.01)
 *D04B 1/22* (2006.01)
 *D04B 9/44* (2006.01)
 *D04B 21/20* (2006.01)

(52) U.S. Cl.
 CPC ............... *D04B 1/225* (2013.01); *D04B 9/44* (2013.01); *D04B 21/205* (2013.01); *D10B 2101/12* (2013.01); *D10B 2505/06* (2013.01)

(58) Field of Classification Search
 CPC .... D04B 9/44; D04B 21/205; D10B 2101/12; D10B 2505/06
 See application file for complete search history.

(56) References Cited

U.S. PATENT DOCUMENTS

| | | | |
|---|---|---|---|
| 6,601,377 B2 | 8/2003 | Tsukamoto | |
| 2009/0108534 A1 | 4/2009 | Ueda | |
| 2015/0052871 A1* | 2/2015 | Hayashi | ................. D02G 3/447 57/245 |
| 2017/0306535 A1* | 10/2017 | Hamaguchi | .............. D04B 1/22 |

FOREIGN PATENT DOCUMENTS

| | | | |
|---|---|---|---|
| JP | 5-118444 A | | 5/1993 |
| JP | 11-336911 A | | 12/1999 |
| JP | 2002-129440 A | | 5/2002 |
| JP | 2007-138315 A | | 6/2007 |
| JP | 2010-255661 A | | 11/2010 |
| KR | 20160091705 A | * | 8/2016 |

\* cited by examiner

YARN AND GLAND PACKING

TECHNICAL FIELD

The invention relates to yarns and gland packings.

BACKGROUND ART

Yarns are known, which each include elongated expanded graphites and a tubular member in which the expanded graphites are packed. For example, a yarn disclosed in Patent Literature 1 consists of a tubular member filled with fibrous expanded graphites with a constant length.

CITATION LIST

Patent Literature

Patent Literature 1: JP 2007-138315 A

SUMMARY OF INVENTION

Fibrous expanded graphites of the yarn disclosed in Patent Literature 1 are elongated and straight in the tubular member. Accordingly, the expanded graphites are hardly entangled with each other when they are packed in the tubular member, and thus they provide the shaped yarn with unevenness in thickness. As a result, gland packings made of the yarns can fail to have a sufficient sealing performance.

In view of the above-mentioned problems, the invention is devised. An object of the invention is to achieve the uniformity in thickness of yarns and to enhance the sealing performance of a gland packing made of the yarns.

A yarn according to an embodiment of the invention includes elongated pieces of expanded graphite sheet that are twisted and packed in a tubular member made of knitted or braided fibers.

That structure can easily entangle one piece of expanded graphite sheet with another, and thus, it can prevent each piece of expanded graphite sheet from moving relative to others. Even if the tubular member filled with pieces of expanded graphite sheet receives an external force to move the pieces of expanded graphite sheet relative to the tubular member in an axial direction of the tubular member, the pieces of expanded graphite sheet hardly lose their uniformity in density in the tubular member. This enables the yarn to substantially maintain its uniform thickness. As a result, a gland packing made of the yarns can enhance its sealing performance.

Each piece of expanded graphite sheet may be twisted at five turns or less per 100 mm.

Such an appropriate number of turns at which pieces of expanded graphite sheet are twisted can suppress failures of fracture and lack of the pieces of expanded graphite sheet during the shaping of the tubular member filled with the pieces of expanded graphite sheet, although an excessive number of the turns facilitates the failures. Thus, suppression of the failures can be achieved with thickness equalization of the yarns. In addition, a gland packing made of the yarns can further enhance its sealing performance.

A gland packing according to an embodiment of the invention includes the above-mentioned yarns that are knitted, or that are bundled and twisted.

This structure enables the gland packing to enhance its sealing performance.

The invention can achieve the uniformity in thickness of yarns and enhance the sealing performance of a gland packing made of the yarns.

DESCRIPTION OF EMBODIMENTS

An embodiment of the invention will be explained with reference to the drawings.

Figure 1:
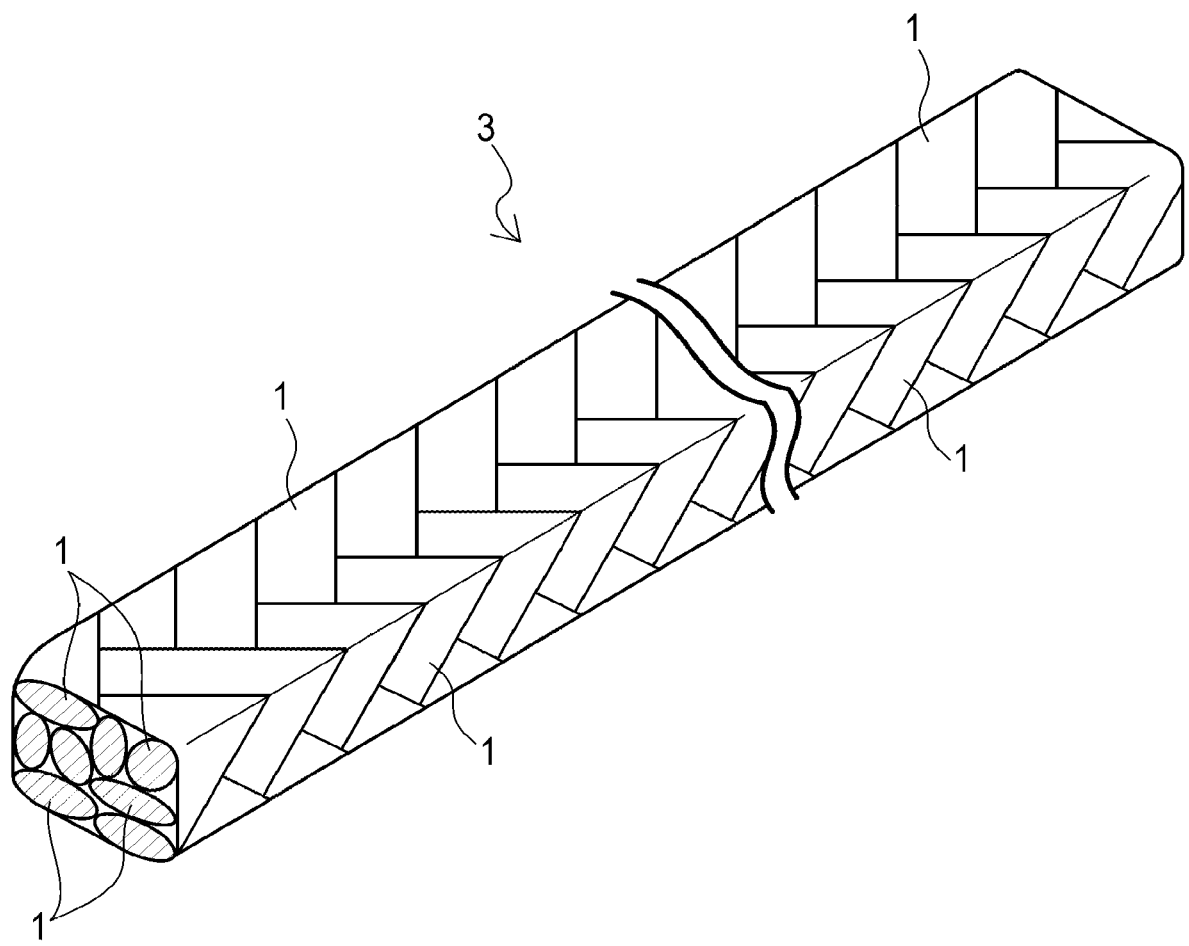
FIG. 1 is a schematically perspective view of a gland packing with yarns according to an embodiment of the invention.
Figure 2:
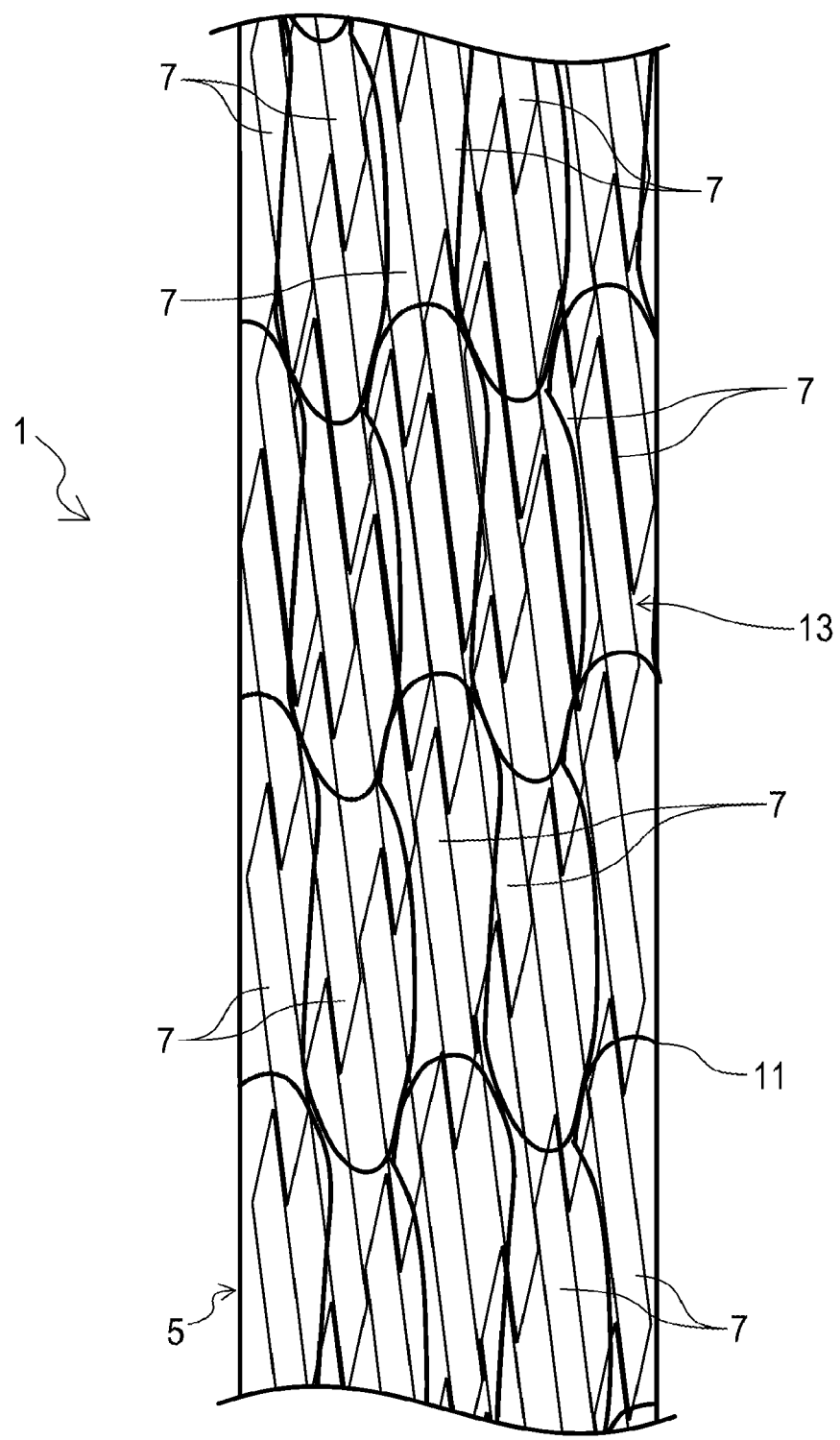
FIG. 2 is a front elevation view of a portion of the yarn in FIG. 1.

FIG. 1 is a schematically perspective view of a gland packing 3 with yarns 1 according to an embodiment of the invention. FIG. 2 is a front elevation view of a portion of the yarn 1.

As shown in FIG. 1, the yarns 1 are used to form the gland packing 3. The yarns 1 may be used to form a product other than the gland packing 3, such as a cloth for heat insulator.

In the gland packing 3, the yarns 1 are knitted. The gland packing 3 only consists of the yarns 1.

In another gland packing, bundles of the yarns 1 may be twisted. The yarns 1 may also form a gland packing with other material such as cores prepared separately.

As shown in FIG. 2, each of the yarns 1 includes a tubular member 5 and elongated pieces of expanded graphite sheet 7. In the tubular member 5, the pieces of expanded graphite sheet 7 are twisted and packed.

The tubular member 5 is formed by knitted fibers. The tubular member 5 has a net-like structure. For example, the tubular member 5 has a tubular-knitted structure, in which fibers 11 are knitted.

The fibers 11 included in the tubular member 5 are made of metal such as inconel or stainless. The fibers 11 have a circular cross section with a diameter of about 0.1 mm, for example.

The fibers according to the embodiment of the invention are not limited to the metal ones 11, and they may be ones made from silk or cotton, or chemical ones.

The tubular member 5 has meshes 13 that each have a size to prevent the pieces of expanded graphite sheet 7 packed in the tubular member 5 from escaping out of the tubular member 5. The tubular member 5 allows some pieces of expanded graphite sheet 7 to be exposed to the outside through the meshes 13.

In the tubular member 5, the pieces of expanded graphite sheet 7 are arranged such that their longitudinal axes extend along the axial direction of the tubular member 5 and lie next to each other in the radial directions of the tubular member 5.

Figure 3:
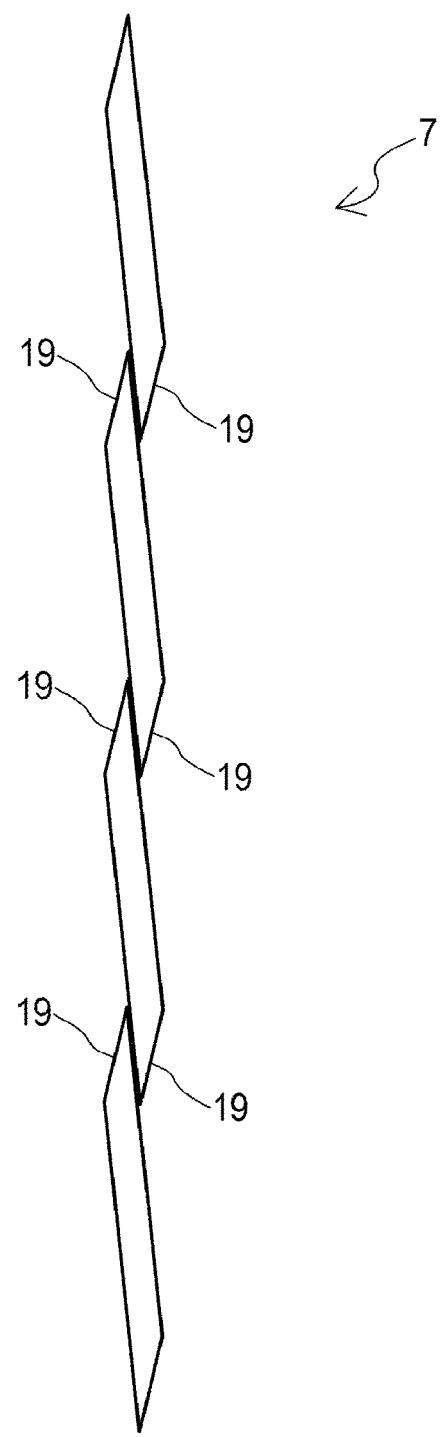
FIG. 3 is a front elevation view of one piece of expanded graphite sheet in the yarn in FIG. 1.
Figure 4:
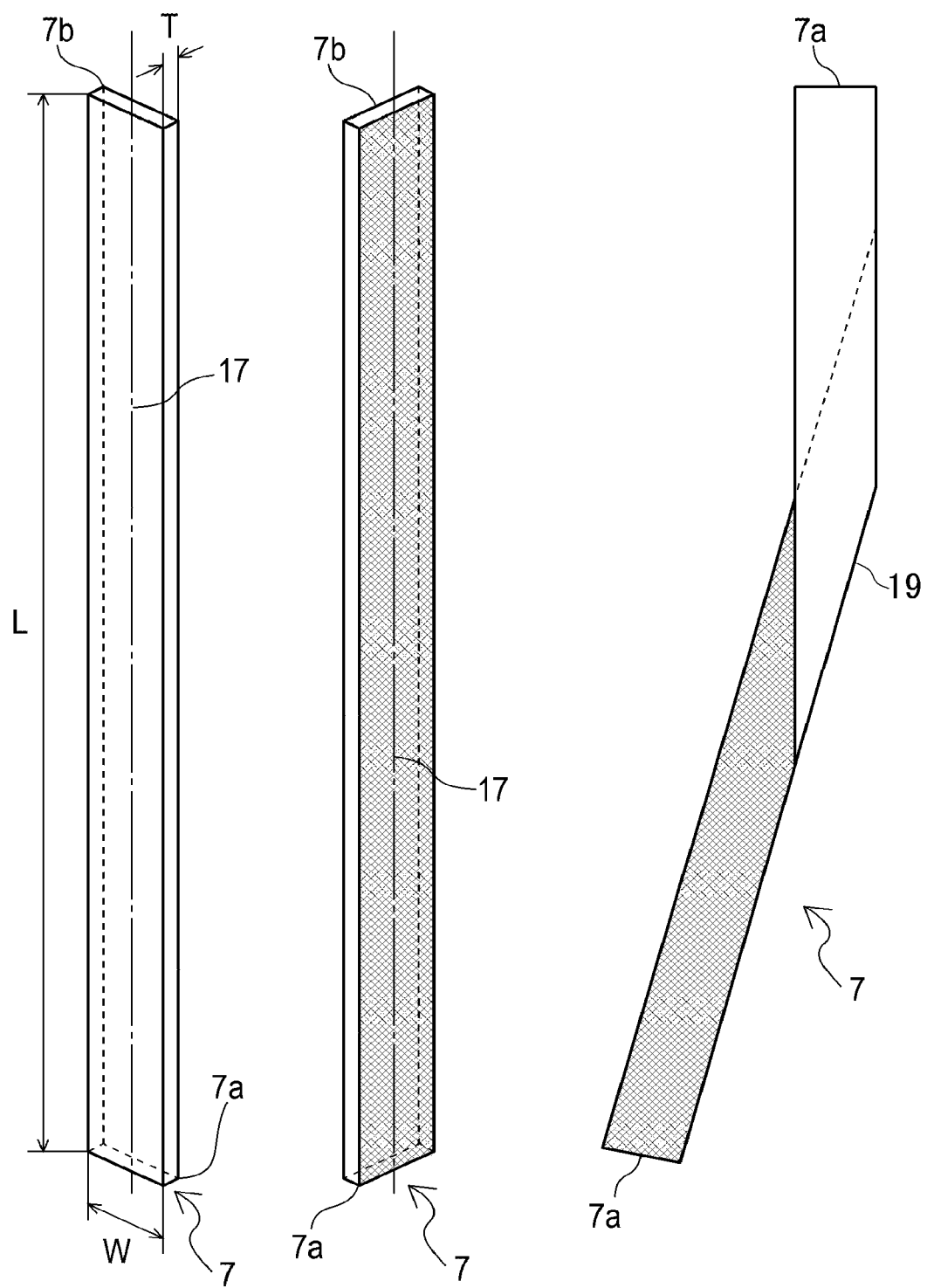
FIG. 4A is a front perspective view of the piece of expanded graphite sheet in FIG. 3 before twisted.
FIG. 4B is a rear perspective view of the piece of expanded graphite sheet in FIG. 4A before twisted.
FIG. 4C is a front elevation view of the piece of expanded graphite sheet in FIG. 4A twisted at one turn.

FIG. 3 is a front elevation view of one piece of expanded graphite sheet 7 in the yarn 1. FIG. 4A is a front perspective view of the piece of expanded graphite sheet 7 before twisted. FIG. 4B is a rear perspective view of the piece of expanded graphite sheet 7 before twisted.

FIG. 4C is a front elevation view of the piece of expanded graphite sheet 7 in FIGS. 4A and 4B twisted at one turn. For convenience of illustration, the rear surface of the piece of expanded graphite sheet 7 is hatched in FIGS. 4B and 4C.

As shown in FIGS. 2, 3, and 4A-4C, each piece of expanded graphite sheet 7 has an elongated shape and a size to be twisted as shown in FIG. 3 and packed in the tubular member 5.

More specifically, the piece of expanded graphite sheet 7 has a longitudinal length shorter than the axial length of the tubular member 5. The piece of expanded graphite sheet 7 has a width, i.e. a transversal length and thickness both smaller than the radial length of the tubular member 5.

As shown FIGS. 4A and 4B, each piece of expanded graphite sheet 7 before twisted has a thin-plate-like shape whose front view is substantially rectangular. The piece of expanded graphite sheet 7 has a width W and a thickness T smaller than the width W.

Each piece of expanded graphite sheet 7 before twisted has a length L of 100 mm to 300 mm, a width W of 0.25 mm to 2.5 mm, and a thickness T of 0.25 mm to 1.0 mm.

The piece of expanded graphite sheet 7 is then twisted at one turn. See FIG. 4C. By being twisted at several turns in that manner, the piece of expanded graphite sheet 7 forms a final twisted shape. See FIG. 3.

Twisting the piece of expanded graphite sheet 7 at one turn means that its one axial end 7a is rotated 180 degrees around a longitudinal center line 17, i.e. its one axial end 7a is flipped while its other axial end 7b is fixed.

Each piece of expanded graphite sheet 7 has a length of about 200 mm. The piece 7 is twisted at six turns per 200 mm, i.e. three turns per 100 mm.

A twisted piece of expanded graphite sheet 7 includes flexed portions 19 whose number is the same as the number of twist turns. At each flexed portion 19, a longitudinal intermediate portion of the twisted piece 7 is bent.

When twisted pieces of expanded graphite sheet 7 are packed into the tubular member 5, their longitudinal directions are arranged to be substantially parallel to each other while their twisted conditions are maintained.

Such an arrangement can easily entangle one piece of expanded graphite sheet 7 with another, thus preventing each piece thereof from moving relative to others.

Figure 6:
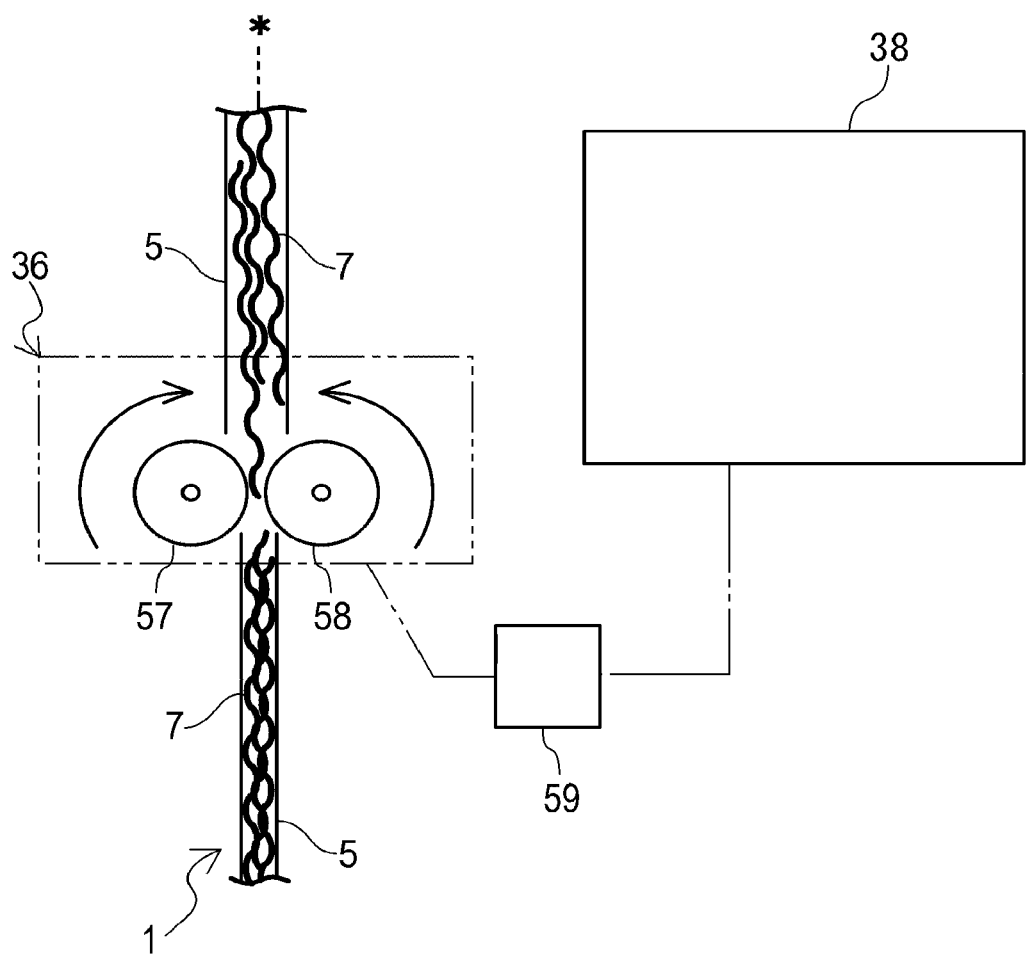
FIG. 6 is a second schematic view of another portion of the equipment in FIG. 5.

Accordingly, pieces of expanded graphite sheet 7 hardly lose their uniformity in density in the tubular member 5 filled with the pieces 7, even if the tubular member 5 receives an external force to move the pieces 7 relative to the tubular member 5 in an axial direction of the tubular member 5, for example, even if the tubular member 5 filled with the pieces 7 are flattened by a pressing member such as a pair of rollers 57 and 58, as shown in FIG. 6, to form the yarn 1 into a flattened shape.

Even in this case, the yarn 1 can maintain its substantially uniform thickness. This can enhance the sealing performance of the gland packing made of the yarns 1.

The gland packing according to the invention is preferably made of the yarns according to the invention, but this is not a limited condition. Yarns forming a gland packing only have to partially include the yarns according to the invention.

Each piece of expanded graphite sheet 7 is twisted at 1 to 10 turns per 200 mm, i.e. 1 to 5 turns per 100 mm.

Preferably, each piece of expanded graphite sheet 7 is twisted at six turns per 200 mm, i.e. three turns per 100 mm.

That configuration can prevent failures caused by twisting pieces of expanded graphite sheet 7. The pieces 7 twisted at an excessive number of turns tend to be broken at the flexed portions 19 when the tubular member 5 filled with the pieces 7 is flattened. In addition, the broken pieces 7 tend to escape from the tubular member 5 through the meshes 13. This can cause loss of the pieces 7 in the tubular member 5 and provide voids therein. If the number of twist turns falls within the above-mentioned range, those failures can be prevented.

While preventing those failures, that configuration can also equalize the thickness of the yarns 1 and further enhance the sealing performance of the gland packing 3 made of the yarns 1.

The gland packing 3 is formed by knitting the yarns 1 to enhance its sealing performance.

Figure 5:
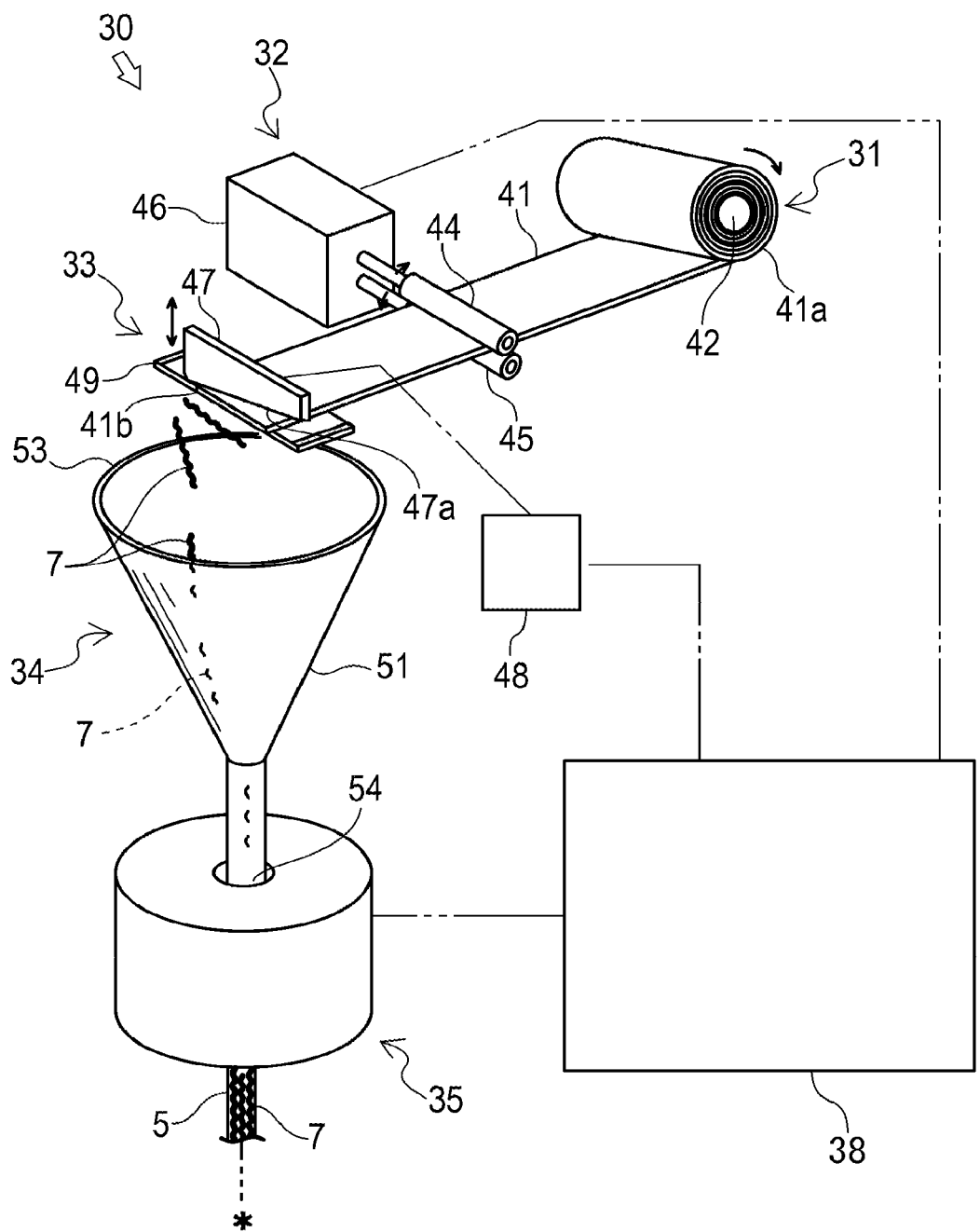
FIG. 5 is a first schematic view of a portion of equipment for manufacturing the yarns in FIG. 1.

FIG. 5 is a first schematic view of a portion of equipment 30 for manufacturing the yarns 1. FIG. 6 is a second schematic view of another portion of the equipment 30. The portion marked by "*" in FIG. 5 is connected to the portion marked by "*" in FIG. 6.

The yarns 1 can be manufactured by the equipment 30 in FIGS. 5 and 6, which is an example of means for manufacturing the yarns 1.

As shown in FIGS. 5 and 6, the equipment 30 includes a supply system 31, a transport system 32, a cutting system 33, a guiding system 34, a knitting machine 35, and a pressing machine 36. The equipment 30 also includes a control device 38 that can control the above-listed portions.

The supply system 31 has a sheet member 41, i.e. a roll of expanded graphite sheet and a core 42. Most part of the sheet member 41 is a portion 41a rolled around the core 42.

The rolled portion 41a of the sheet member 41 rotates by the action of the transport system 32, and then, the rolled portion 41a is gradually unwound from the core 42 and carried toward a longitudinal end 41b of FIG. 5, i.e. toward the cutting system 33.

The transport system 32 has a pair of rollers 44 and 45 and a driving unit 46 to rotate the rollers 44 and 45.

Between the rollers 44 and 45, the transport system 32 places the sheet member 41 sent from the supply system 31.

The transport system 32 rotates the rollers 44 and 45 by the driving unit 46 to pull and send the sheet member 41 from the supply system 31 toward the longitudinal end 41b of FIG. 5, i.e. toward the cutting system 33.

The cutting system 33 has a chopping blade 47, a driving unit 48 to move the chopping blade 47, and a platform 49.

The cutting system 33 reciprocates the chopping blade 47 such that the blade 47 approaches or separates from the sheet member 41.

The cutting system 33 cuts the sheet member 41 reaching the platform 49 along the direction perpendicular to the traveling direction of the sheet member 41. Each strip cut from the longitudinal end 41*b* of the sheet member 41 is separated from the rest of the sheet member 41.

The guiding system 34 has a hopper 51 with an upper opening 53 and a lower opening 54. The upper opening 53 has a larger diameter than the lower opening 54. The hopper 51 is arranged so that the upper opening 53 is positioned below the cutting system 33.

The guiding system 34 receives pieces of expanded graphite sheet 7 cut by the cutting system 33 through the upper opening 53, then guiding the pieces 7 from the upper opening 53 to the lower opening 54 and sending them to the knitting machine 35.

The knitting machine 35 can form the tubular member 5 by knitting the fibers 11. The knitting machine 35 causes the knitted tubular member 5 to extend downward so that the opening of the tubular member 5 faces the lower opening 54 of the hopper 51.

In the knitting machine 35, pieces of expanded graphite sheet 7 sent from the guiding system 34 enter the knitted tubular member 5. The knitting machine 35 sends the tubular member 5 filled with the pieces 7 to the pressing machine 36.

The pressing machine 36 has a pair of rollers 57 and 58 and a driving unit 59 to rotate the roller 57 and 58. The pressing machine 36 presses the tubular member 5 filled with pieces of expanded graphite sheet 7 after the tubular member 5 is sent from the knitting machine 35.

The pressing machine 36 places the tubular member 5 filled with pieces of expanded graphite sheet 7 between the rotating rollers 57 and 58, thus flattening the tubular member 5.

In that manner, the equipment 30 can form the yarns 1 into a flattened shape. During the process of manufacturing by the equipment 30, more specifically, at the cutting step by the cutting system 33, pieces of expanded graphite sheet 7 are twisted before packed in the tubular member 5.

Figure 7A:
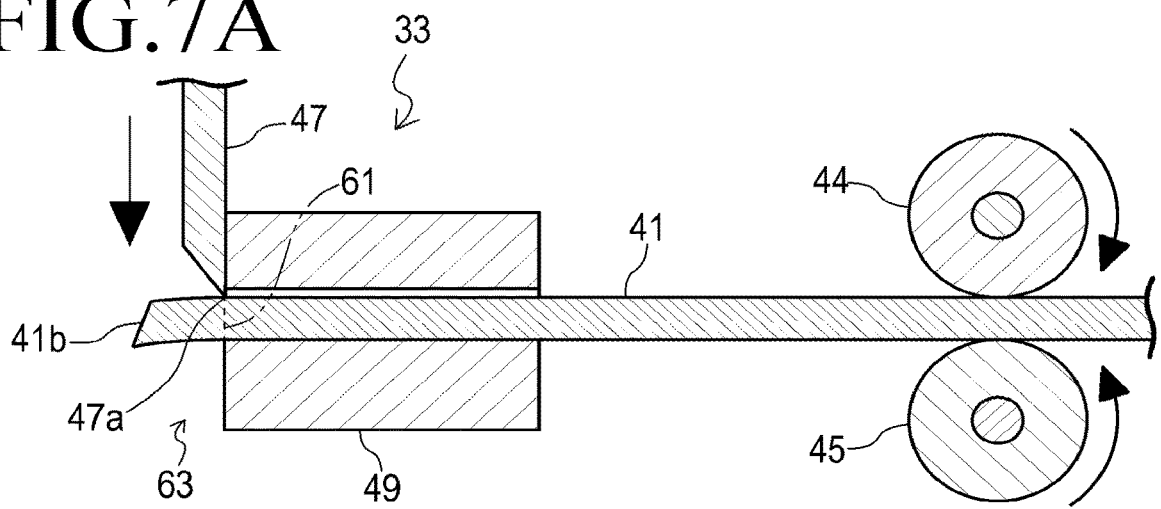
FIG. 7A is a schematic view of a first step of forming a piece of expanded graphite sheet in the equipment in FIG. 5.
Figure 7B:
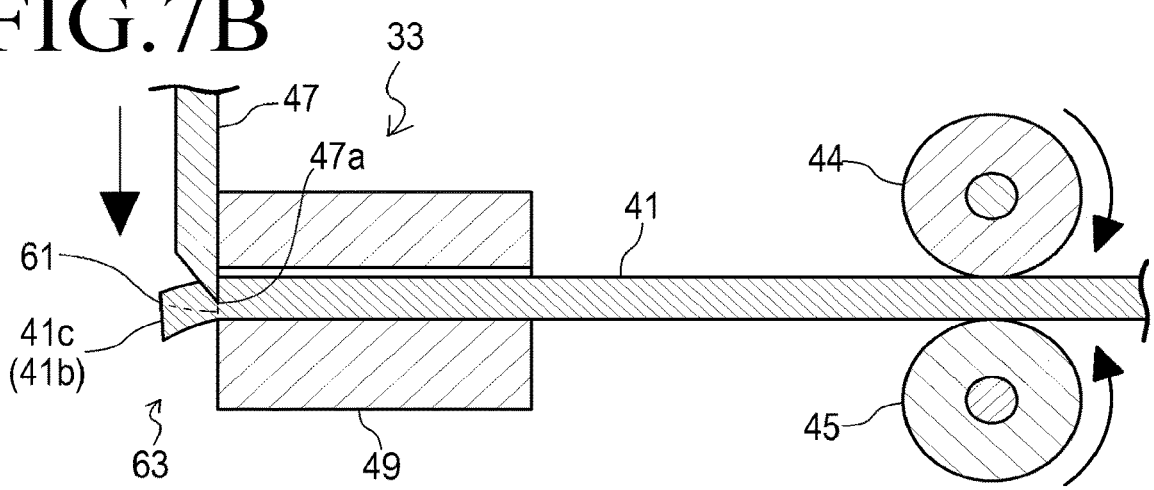
FIG. 7B is a schematic view of a second step of forming the piece of expanded graphite sheet in FIG. 7A.

FIG. 7A is a schematic, cross-sectional view of a first step of forming a piece of expanded graphite sheet 7 by the cutting system 33. FIG. 7B is a schematic, cross-sectional view of a second step of forming the piece of expanded graphite sheet 7 by the cutting system 33.

Figure 7C:
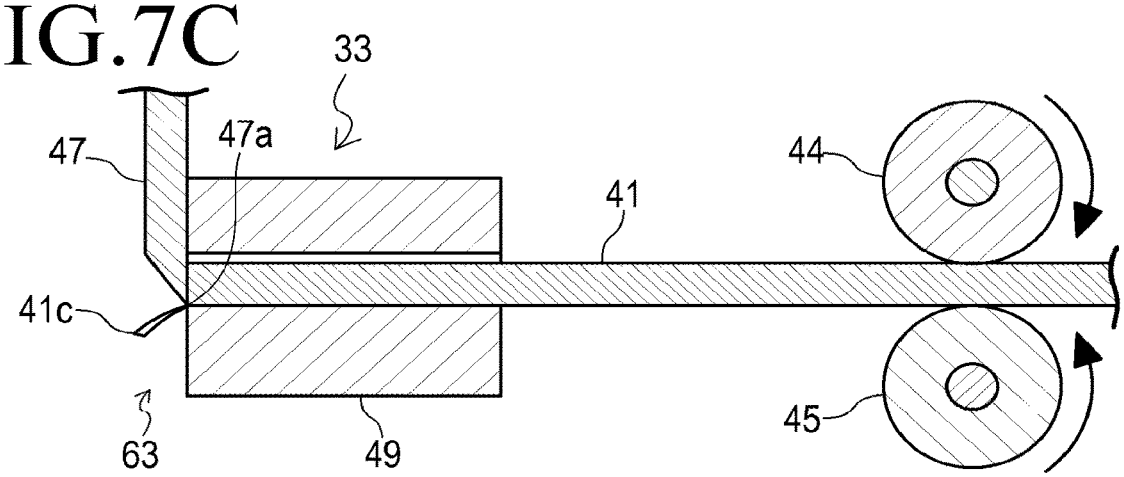
FIG. 7C is a schematic view of a third step of forming the piece of expanded graphite sheet in FIG. 7A.
Figure 8A:
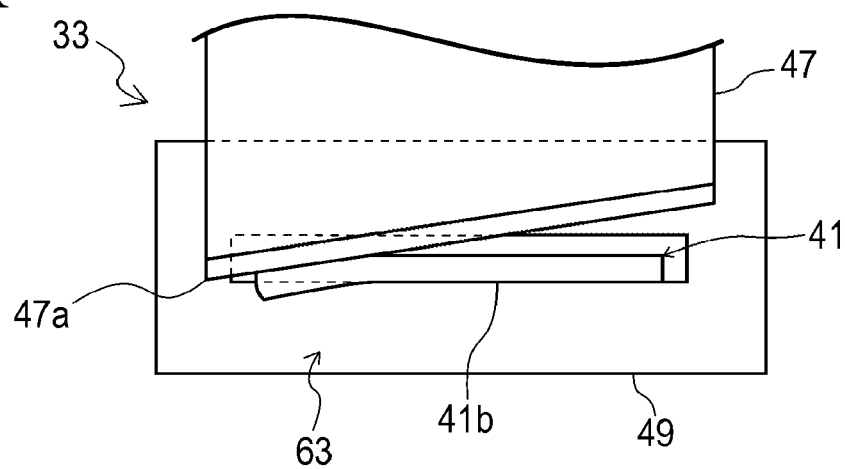
FIG. 8A is a view of the piece of expanded graphite sheet in FIG. 7A from its traveling direction.
Figure 8B:
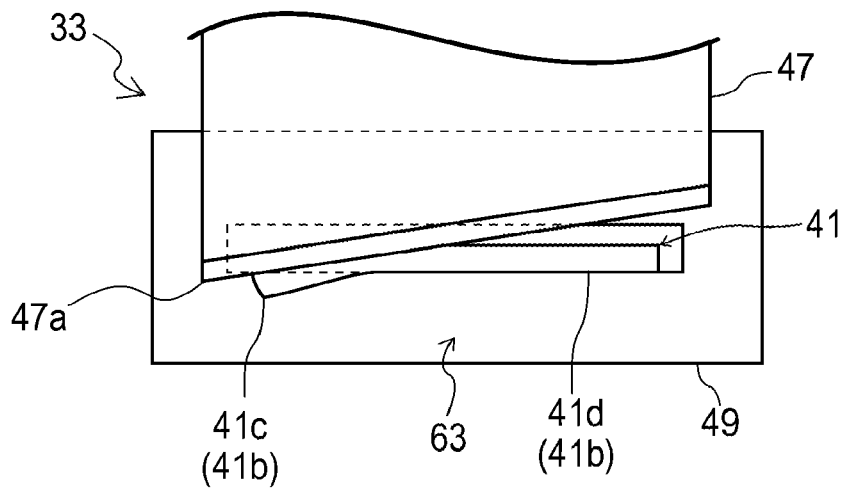
FIG. 8B is a view of the piece of expanded graphite sheet in FIG. 7B from its traveling direction.
Figure 8C:
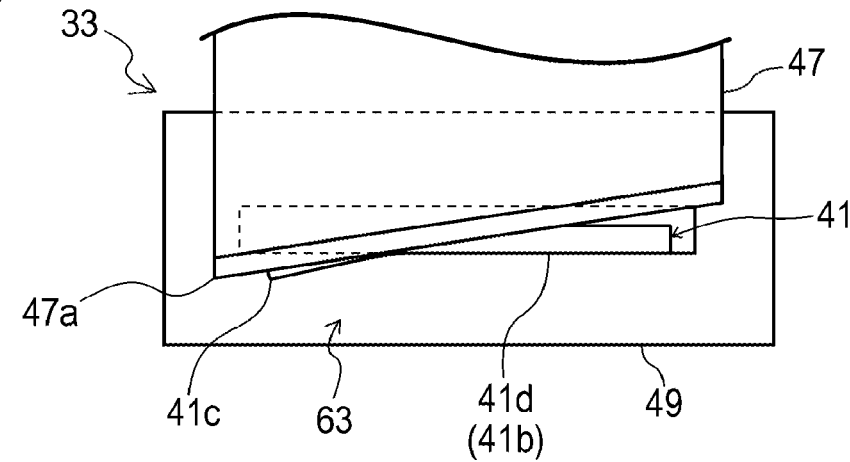
FIG. 8C is a view of the piece of expanded graphite sheet in FIG. 7C from its traveling direction.

FIG. 7C is a schematic, cross-sectional view of a third step of forming the piece of expanded graphite sheet 7 by the cutting system 33. In the order shown in FIGS. 7A, 7B, and 7C, the process of forming each piece of expanded graphite sheet 7 progresses. FIGS. 8A, 8B, and 8C are views of the piece of expanded graphite sheet 7 in FIGS. 7A, 7B, and 7C, respectively, from the traveling direction of the sheet member 41.

When the cutting system 33 cuts one piece of expanded graphite sheet 7, the chopping blade 47 moves to bring its edge 47*a* into contact with an upper surface of the sheet member 41 as shown in FIGS. 7A and 8A.

The chopping blade 47 is placed such that its edge 47*a* extends to the direction perpendicular to the traveling direction of the sheet member 41. The edge 47*a* of the chopping blade 47 is inclined at an angle from the upper surface of the sheet member 41. In other words, the straight line along the edge 47*a* is not parallel to the upper surface of the sheet member 41 but inclined at an angle from the upper surface. The edge 47*a* of the chopping blade 47 has its tip located downstream in the traveling direction of the sheet member 41.

The edge 47*a* of the chopping blade 47 brings its tip into contact with the upper surface of the sheet member 41 when the longitudinal end 41*b* of the sheet member 41 moves by a distance downstream in the traveling direction from a point 61 where the chopping blade 47 should cut the sheet member 41.

The platform 49 on which the sheet member 41 is placed is located upstream in the traveling direction from the point 61 such that the longitudinal end 41*b* of the sheet member 41 after passing through the point 61 floats on air, i.e. the platform 49 forms a void 63 below the longitudinal end 41*b*.

As shown in FIGS. 7B and 8B, the edge 47*a* of the chopping blade 47 moves downward at the point 61 from the position in contact with the sheet member 41, and then starts to cut a first transversal end 41*c* of the sheet member 41, i.e. an end located at a deep position in FIG. 7B.

As shown in FIGS. 7C and 8C, the edge 47*a* of the chopping blade 47 completely cuts the first transversal end 41*c* of the sheet member 41. After that, the edge 47*a* of the chopping blade 47 further moves downward and cuts a second transversal end 41*d* of the sheet member 41, i.e. an end located at a front position in FIG. 7B.

When the sheet member 41 is cut, the longitudinal end 41*b* of the sheet member 41 located downstream in the traveling direction from the point 61 is kept floating in air, i.e. the void 63 is kept below the longitudinal end 41*b*.

In that manner, the chopping blade 47 brings its edge 47*a* in contact with the upper surface of the sheet member 41 such that the edge 47*a* crosses the upper surface at a substantially right angle, and then, the edge 47*a* cuts the sheet member 41 into thin strips, i.e. pieces of expanded graphite sheet 7.

Since the edge 47*a* of the chopping blade 47 is inclined at an angle from the upper surface of the sheet member 41, there is a time delay from the start of cutting the first transversal end of the sheet member 41 to the end of cutting the second transversal end thereof.

Since the sheet member 41 is thin, i.e. 0.25 mm to 1.0 mm in thickness, strips cut from the sheet member 41, i.e. pieces of expanded graphite sheet 7 are also thin, i.e. 0.25 mm to 1.0 mm in thickness.

Accordingly, each strip, i.e. each piece of expanded graphite sheet 7 starts to curl at the start of cutting the sheet member 41, and the strip is twisted at the end of cutting the sheet member 41.

Thus, twisted strips, i.e. twisted pieces of expanded graphite sheet 7 are formed and thrown into the hopper 51 of the guiding system 34. In that manner, pieces of expanded graphite sheet 7 can be twisted during the cutting step by the cutting system 33 of the equipment 30.

The number of turns at which each piece of expanded graphite sheet 7 is twisted per 100 mm can be adjusted by change in size of a strip cut at the cutting step, e.g. changing the transversal width of the sheet member 41 or the width of the strip.

In view of the above-described teaching, it is obvious that the invention has many variations and modifications. Accordingly, it should be understood that the invention can be embodied in manners other than the embodiments described in this specification within the scope of the attached claims.

DESCRIPTION OF REFERENCE SYMBOLS

1 yarn, 3 gland packing, 5 tubular member, 7 piece of expanded graphite sheet

What is claimed is:
1. A yarn comprising elongated pieces of expanded graphite sheet that are packed in a tubular member made of knitted or braided fibers, each of the elongated pieces of expanded graphite sheet having an elongated, thin-plate-like shape twisted around its own longitudinal center line at one or more turns, wherein a longitudinal end of the elongated, thin-plate-like shape is rotated by 180 degrees per turn around the longitudinal center line while another longitudinal end thereof is fixed.

2. The yarn according to claim 1, wherein each of the elongated pieces of expanded graphite sheet is twisted at five turns or less per 100 mm.

3. A gland packing comprising the yarns according to claim 1 that are knitted, or that are bundled and twisted.

4. A yarn comprising a flattened shape and elongated pieces of expanded graphite sheet that are packed in a tubular member made of knitted or braided fibers, each of the elongated pieces of expanded graphite sheet having an elongated, thin-plate-like shape twisted around its own longitudinal center line and including flexed portions and a longitudinal intermediate portion that is bent at each of the flexed portions.

5. A gland packing comprising the yarns according to claim 4 that are knitted, or that are bundled and twisted.

6. A method of manufacturing the yarn according to claim 1, the method comprising:

placing an expanded graphite sheet such that a longitudinal end thereof floats on air, and separating each of the elongated pieces of expanded graphite sheet from the longitudinal end with a chopping blade whose edge is placed at an angle on an upper surface of the longitudinal end; and introducing each of the elongated pieces of expanded graphite sheet separated from the longitudinal end into the tubular member, wherein when separated from the longitudinal end, each of the elongated pieces of expanded graphite sheet is formed into an elongated, thin-plate-like shape, which curls around its own longitudinal center line due to a time delay from a start of cutting a first transversal end of the longitudinal end to the end of cutting a second transversal end thereof.

* * * * *